(12) United States Patent
de Traglia Amancio Filho et al.

(10) Patent No.: US 8,518,198 B2
(45) Date of Patent: Aug. 27, 2013

(54) METHOD FOR CONNECTING A PLASTIC WORKPIECE TO A FURTHER WORKPIECE

(71) Applicant: Helmholtz-Zentrum Geesthacht Zentrum für Material-und Küstenforschung GmbH, Geesthacht (DE)

(72) Inventors: Sergio de Traglia Amancio Filho, Börnsen (DE); Jorge F. dos Santos, Tespe (DE); André Bastos Abibe, Geesthacht (DE)

(73) Assignee: Helmholtz-Zentrum Geesthacht Zentrum für Material—und Küstenforschung GmbH, Geesthacht (DE)

( * ) Notice: Subject to any disclaimer, the term of this patent is extended or adjusted under 35 U.S.C. 154(b) by 0 days.

(21) Appl. No.: 13/659,193

(22) Filed: Oct. 24, 2012

(65) Prior Publication Data
US 2013/0098534 A1 Apr. 25, 2013

(51) Int. Cl.
*B32B 37/00* (2006.01)

(52) U.S. Cl.
USPC .................. 156/73.5; 156/293; 156/308.2

(58) Field of Classification Search
USPC ............... 156/73.5, 73.6, 293, 308.2, 309.6, 156/580; 264/68
See application file for complete search history.

(56) References Cited

U.S. PATENT DOCUMENTS

| 4,427,471 A | * | 1/1984 | Chierici ..................... 156/73.5 |
| 5,153,978 A |   | 10/1992 | Simmons |
| 5,298,098 A | * | 3/1994 | Hoedl ........................ 156/73.1 |
| 7,497,917 B2 |   | 3/2009 | Chen et al. |
| 2007/0044901 A1 |   | 3/2007 | Chen et al. |
| 2011/0164945 A1 | * | 7/2011 | Lathabai et al. ............. 411/501 |

FOREIGN PATENT DOCUMENTS

| DE | 3109500 A1 | 10/1982 |
| DE | 3543105 A1 | 6/1987 |
| EP | 1949999 A1 | 7/2008 |
| FR | 2854606 A1 | 11/2004 |
| JP | 53000266 A | 1/1978 |
| JP | 53075280 A | 7/1978 |
| JP | 61189925 A | 8/1986 |
| JP | 62087323 A | 4/1987 |
| JP | 1278331 A | 11/1989 |
| JP | H02 27317 | 2/1990 |
| JP | 4142919 A | 5/1992 |
| WO | WO-9111309 A2 | 8/1991 |

* cited by examiner

*Primary Examiner* — James Sells
(74) *Attorney, Agent, or Firm* — Harness, Dickey & Pierce, P.L.C.

(57) ABSTRACT

A method for connecting a plastic workpiece to a further workpiece. The method includes inserting a pin on the plastic workpiece through a through-opening in the further workpiece and abutting the first and second workpieces against one another. A friction tool, which has a clamping ring and a friction pin, is engaged to the pin and the friction pin is rotated so that frictional heat produced by friction between the friction pin and the pin brings the pin into a plastic state. The rotating friction pin is moved parallel to the axis of rotation toward the working surface so that the pin is plastically deformed.

16 Claims, 3 Drawing Sheets

METHOD FOR CONNECTING A PLASTIC WORKPIECE TO A FURTHER WORKPIECE

CROSS-REFERENCE TO RELATED APPLICATIONS

Figure 1:
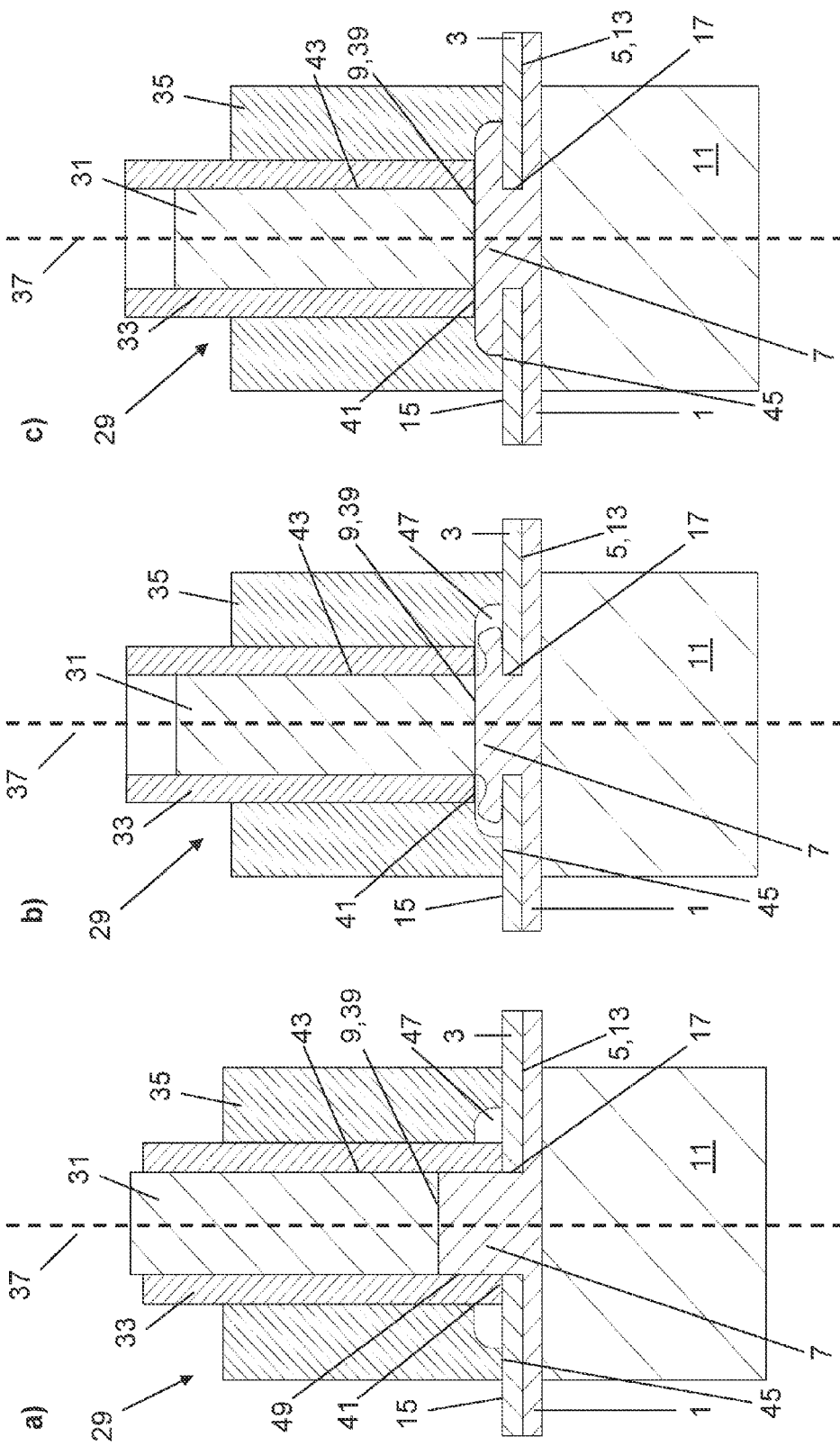

This application claims the benefit and priority of European Patent Application No. EP 11186527.5, filed Oct. 25, 2011. The entire disclosure of the above application is incorporated herein by reference.

FIELD

The present invention relates to a method for connecting a plastic workpiece to a further workpiece.

BACKGROUND

In the automobile and aircraft industries there is increasing use of components in which plastic workpieces have to be positively connected to other workpieces made of metal or composite materials. Methods which utilize the deformability of the plastic workpiece are particularly suitable for this.

The prior art discloses a series of methods with the aid of which a plastic workpiece is connected to a further workpiece by utilizing the deformability of the plastic workpiece. For example, it is known that a plastic workpiece has a projection that extends away from an abutting surface. On the abutting surface there is placed a further workpiece, which has a through-opening. This through-opening is formed in such a way that it receives the projection, the projection protruding out of the further workpiece through the through-opening. To connect the plastic workpiece to the further workpiece, the part of the projection that is protruding out of the further workpiece is mechanically deformed. In the simplest embodiment of this method, so much pressure is exerted on the projection by means of a tool that the projection is plastically deformed. The plastic workpiece and the further workpiece are said to have been cold connected. This connecting method is known as staking and has very short cycle times.

In many plastics, however, cracks occur in the projection during such cold connecting, having the effect of restricting the durability of the connection between the further workpiece and the plastic workpiece. In order to reduce the loading caused by the deformation, this projection may be brought into a plastic state before the deforming. This may be performed, for example, by blowing in hot air. In this case, however, the plastic is heated only very slowly by the hot air, greatly increasing the cycle time of the method. In other embodiments, a heated tool is used for deforming the projection. In this case, the tool is heated by means of heating resistors, ultrasound, infrared radiation, laser radiation or other means, depending on the embodiment. The projection brought into a plastic state can be plastically deformed without the material being subjected to great loads. The "warm" connections created in this way are much more durable than the previously mentioned "cold" connections.

However, all methods that provide a warm connection have a particularly high energy consumption, since the tools have to be very hot to achieve a short cycle time. The ultrasonic and laser heaters that are regularly used for this are also extremely complex to produce and maintain.

Finally, it is known from U.S. Pat. No. 7,497,917 that, when connecting a plastic workpiece to a metallic workpiece, a friction tool is brought into contact with the region of the surface of the metallic workpiece that surrounds the opening through which the projection of the plastic workpiece extends. The rotating friction tool introduces energy into the metallic workpiece, which leads to heating thereof and subsequently also heating of the plastic workpiece and the projection provided on it. As a result, the projection is brought into a plastic state, and a positive connection is obtained.

A disadvantage here is once again that the cycle times are comparatively long on account of the required heat transfer between the metal workpiece and the plastic workpiece, the heat transfer being influenced decisively by the nature of the abutting surface between the plastic workpiece and the metal workpiece.

SUMMARY

On the basis of the prior art, it is therefore the object of the present invention to provide a method for positively connecting a plastic workpiece to a further workpiece that dispenses with complex means, uses little energy and has short cycle times.

This object is achieved by a method with the following steps: providing a plastic workpiece, comprising a first abutting surface, provided on which is a pin projecting away from it and having an end face facing away from the first abutting surface; providing a further workpiece, comprising a second abutting surface and a working surface opposite from the second abutting surface, a through-opening which is adapted to the cross section of the pin and extends from the second abutting surface to the working surface being provided in the further workpiece; placing the further workpiece and the plastic workpiece against each other in such a way that the second abutting surface lies on the first abutting surface, the pin extending through the through-opening, beyond the working surface; placing a friction tool against the further workpiece, the friction tool having a friction pin driven in a rotating manner about an axis of rotation and comprising a friction surface extending perpendicularly in relation to the axis of rotation and having a clamping ring comprising a clamping surface extending perpendicularly in relation to the axis of rotation, the clamping ring surrounding the friction pin and the friction pin and the clamping ring being able to be moved parallel to the axis of rotation; placement involving the friction surface being placed flat on the end face and the clamping surface being placed flat on the working surface; rotating the friction pin, so that the frictional heat produced by friction between the friction surface and the end face brings the pin into a plastic state; and moving the rotating friction pin parallel to the axis of rotation toward the working surface, so that the pin is plastically deformed.

In the method according to the invention, a plastic workpiece comprising a first abutting surface is provided. Provided on the abutting surface is a pin extending away from it and having an end face facing away from the first abutting surface.

Also provided is a further workpiece, which is preferably formed from a metal, a metal alloy, a ceramic or a composite material. In a further preferred embodiment, the further workpiece may also be formed from a plastic. The further workpiece has a second abutting surface and a working surface opposite from the second abutting surface. Provided in the further workpiece is a through-opening, which is adapted to the cross section of the pin and extends from the second abutting surface to the working surface.

The further workpiece and the plastic workpiece are placed against each other in such a way that the second abutting surface of the further workpiece lies on the first abutting surface of the plastic workpiece. The pin thereby extends through the through-opening and beyond the working surface.

In a further step, a friction tool is placed against the further workpiece. The friction tool has a friction pin driven in a rotating manner about an axis of rotation and comprising a friction surface extending perpendicularly in relation to the axis of rotation and has a clamping ring comprising a clamping surface extending perpendicularly in relation to the axis of rotation. In this case, the clamping ring surrounds the friction pin, and the friction pin and the clamping ring can be moved parallel to the axis of rotation. The friction tool is placed in such a way that the friction surface lies flat on the end face and the clamping surface lies flat on the working surface.

In the following step, the friction pin is rotated while the clamping ring lies fixedly on the working surface and is not moved, so that the frictional heat produced by friction only between the friction surface and the end face brings the pin into a plastic state. After that, the rotating friction pin is moved parallel to the axis of rotation toward the working surface, so that the pin is plastically deformed.

The advantage of the method according to the invention is its extremely high efficiency. On the one hand, this method can be carried out with the same devices that are used for friction welding, on the other hand the energy consumption is very low in comparison with the methods according to the prior art, since the kinetic energy is converted into heat extremely efficiently by the friction. In particular, the frictional heat is introduced directly into the plastic workpiece, without any problematic thermal conduction processes occurring.

In addition, the cycle time that is required for producing a connection according to the invention is shorter than the cycle time that the methods according to the prior art require.

Apart from that, the deformation of the free end of the pin is brought about directly by the moving of the friction pin, so that a reliable interlocking engagement between the workpieces is ensured.

Furthermore, the friction tool that is used is held purely mechanically and there are no complex systems for heat generation. As a result, the maintenance and production costs are reduced.

Finally, in the case of the method according to the invention, contamination of the area surrounding the connection by material of the workpieces is avoided since the clamping ring surrounding the connection or the pin ensures that no discharge of material occurs.

In a particularly preferred embodiment, the dimensions of the friction surface are chosen such that, when there is a rotation of the pin about the axis of rotation, the entire end face lies flat against the friction surface at all angles of rotation. This ensures that the pin is uniformly heated, and consequently also uniformly brought into a plastic state.

It is also preferred that the pin is of a distinctly cylindrical form. This is particularly advantageous since, by simple drilling, the through-opening can be made such that its inside diameter corresponds to the outside diameter of the pin, thereby increasing the strength of the connection.

In a further preferred embodiment, the friction tool has a sleeve comprising a sleeve friction surface extending perpendicularly in relation to the axis of rotation. The sleeve is driven in a rotating manner about the axis of rotation, can be moved parallel to the axis of rotation and is arranged between the friction pin and the clamping ring.

In the case of a first alternative, when the friction pin rotates, the sleeve is likewise rotated and, when the friction pin moves toward the working surface, the sleeve is moved away from the working surface. Placement of the friction tool involves the sleeve friction surface being placed against the working surface.

If in the case of this alternative the sleeve is set in rotation, the sleeve friction surface initially also heats the further workpiece, which gives off the heat to the pin. As a result, the pin is uniformly heated more quickly, whereby the cycle time is shortened and the pin is subjected to still lower loads during the plastic deformation, which once again increases the durability of the connection. Furthermore, frictional energy is not only introduced into the pin via the end face but also via the outer surface of the pin extending parallel to the axis of rotation. Finally, the moving of the sleeve away from the working surface, in opposition to the moving direction of the friction pin, allows the deformation of the pin to be controlled.

In a second alternative, during the rotation of the friction pin the sleeve is likewise rotated, while during the moving of the rotating friction pin the rotating sleeve is also moved parallel to the friction surface toward the working surface. On the one hand, it is possible for the sleeve friction surface to be in the plane of the friction surface during the moving.

As a result, pins with an end face that has greater dimensions than the friction surface can also be worked by the tool, since frictional energy is then introduced into the pin not only via the friction surface of the friction pin but also via the sleeve friction surface. This is particularly advisable whenever pins of different sizes on the same plastic workpiece are to be worked, since the tool does not have to be exchanged between two pins of different dimensions.

On the other hand, it is possible to arrange the sleeve friction surface offset from the plane of the friction surface during the moving. In a particularly preferred embodiment, the inside diameter of the sleeve then corresponds to the outside diameter of the pin. Placement of the friction tool involves the sleeve also being positioned in such a way that an inner surface of the sleeve that is facing the friction pin lies against the pin. If the sleeve is also set in rotation in this configuration, the outer surface of the pin is also heated, whereby the pin is brought into a plastic state particularly quickly, which shortens the cycle time and reduces the mechanical loads to which the pin is subjected during the plastic deformation.

In a preferred way, the through-opening is made such that, alongside the working surface there is provided a portion in which the dimensions of the through-opening increase toward the working surface. In particular in the case of a circular through-opening, the diameter can increase in this portion. Such a configuration involves the advantage that it is possible for a positive connection to be achieved already by the pin being expanded within the through-opening during the deformation. This increases the strength of the connection, and it may also be possible to dispense with the need for the deformed pin to extend out of the through-opening beyond the working surface and for it to lie against the working surface.

It is also preferred that one or more clearances, which extend perpendicularly in relation to the through-opening, are provided in the inner wall of the through-opening of the further workpiece. Here, too, a positive connection can already be achieved by the pin being deformed into the clearance, whereby the aforementioned advantages are obtained.

In a further preferred embodiment, a helically extending depression is provided in the inner wall of the through-opening of the further workpiece. Here a positive connection can likewise be produced just by the deformation of the pin into the helically extending depression. The aforementioned advantages are also obtained for this positive connection.

DRAWINGS

Figure 2:
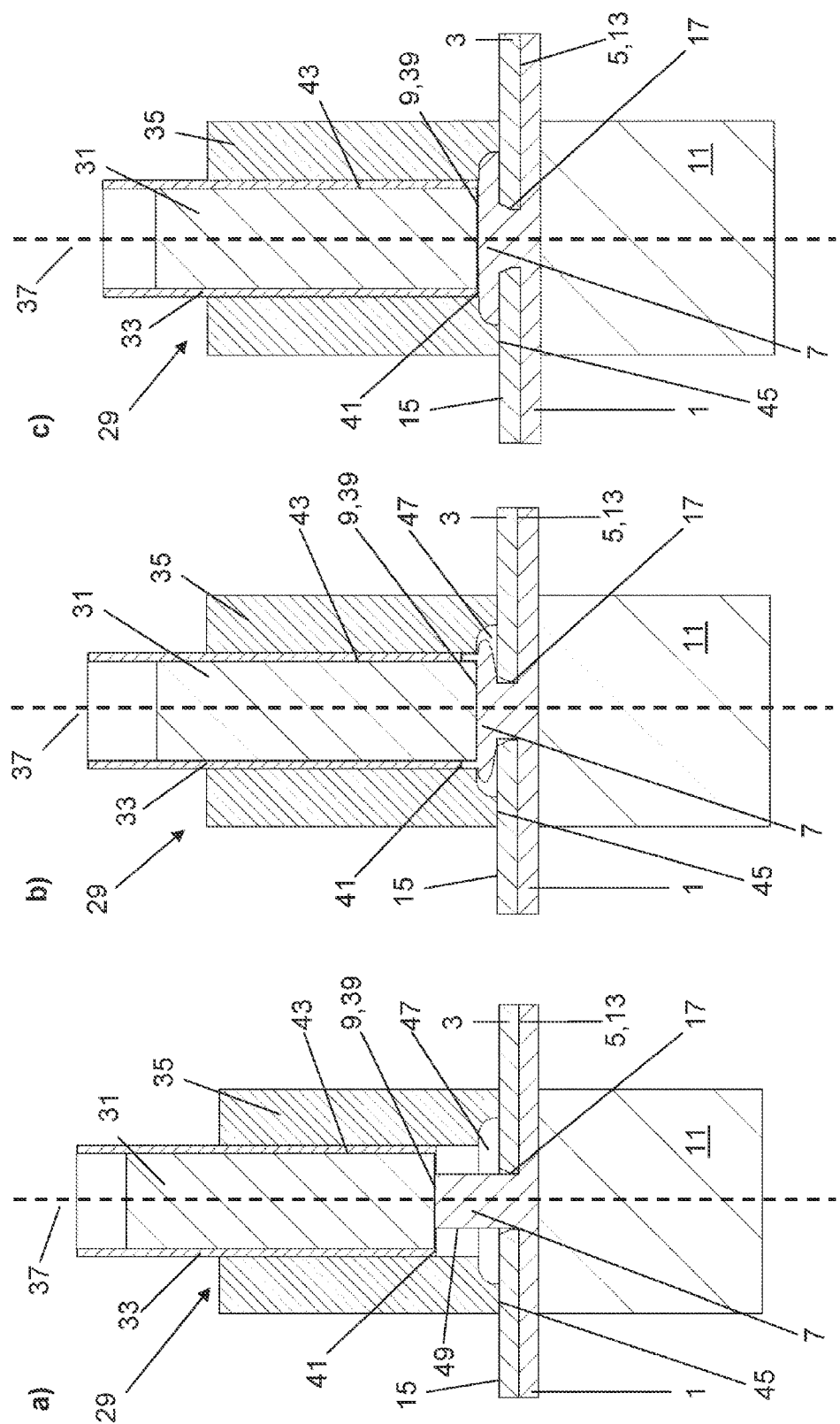
Figure 3:
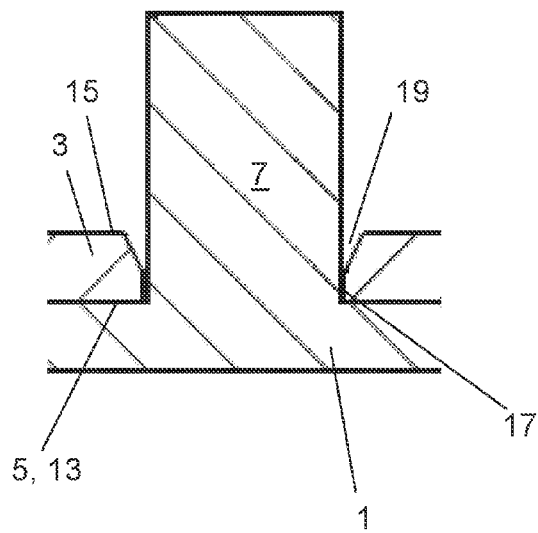
Figure 4:
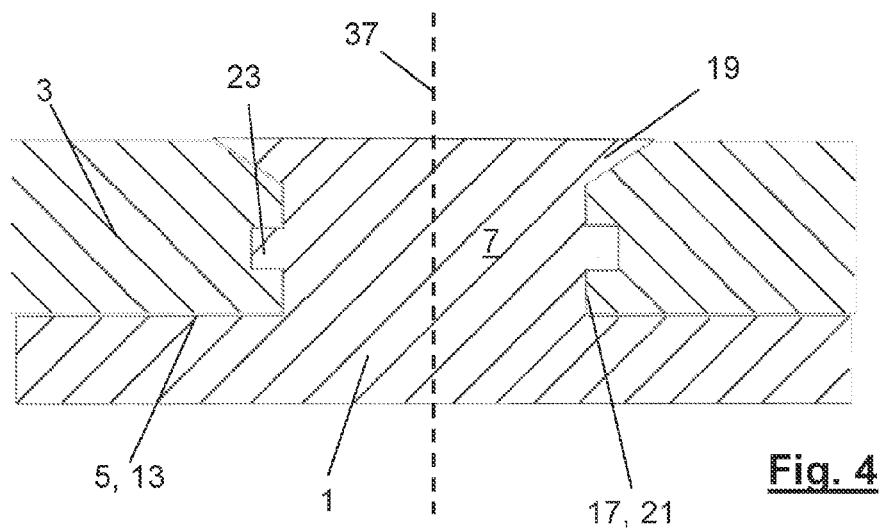
Figure 5:
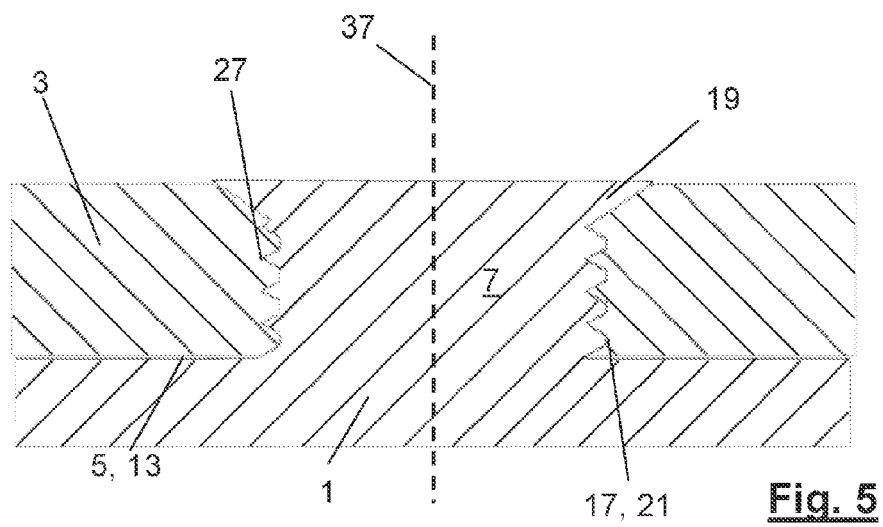

The present invention is explained below on the basis of the drawing that merely shows preferred exemplary embodiments and in which:

FIG. 1 shows a first preferred exemplary embodiment of the method according to the invention, FIG. 2 shows a second preferred exemplary embodiment of the method according to the invention, FIG. 3 shows an enlarged representation of an exemplary embodiment according to the invention of the through-opening in the further workpiece, FIG. 4 shows an enlarged representation of a further exemplary embodiment according to the invention of the through-opening in the further workpiece and FIG. 5 shows an enlarged representation of a further exemplary embodiment according to the invention of the through-opening in the further workpiece.

DETAILED DESCRIPTION

In FIG. 1, a number of steps of a first exemplary embodiment of a method according to the invention for connecting a plastic workpiece 1 to a further workpiece 3 are represented. The plastic workpiece 1 has a first abutting surface 5, provided on which there is a cylindrical pin 7 extending away from the first abutting surface 5 and having an end face 9. Arranged underneath the plastic workpiece 1 is a counter bearing 11.

The further workpiece 3 that is provided, preferably formed from a metal or a composite material, has a second abutting surface 13 and a working surface 15 opposite from the second abutting surface 13. Furthermore, a through-opening 17, which extends from the second abutting surface 13 to the working surface 15 and is adapted to the cross section of the pin 7 is provided in the further workpiece 3.

As can be seen in the detail in FIG. 3, the through-opening 17 may have alongside the working surface 15 a portion 19, in which the dimensions of the through-opening 17 increase toward the working surface 15. In particular, in the case of the through-opening 17 represented here, circularly formed in a preferred way, the diameter of the through-opening 17 increases in the portion 19.

In the representation of a detail of the through-opening 17 in FIG. 4 it can be seen that, in addition to the portion 19, in which the dimensions of the through-opening 17 increase toward the working surface 15, one or more clearances 23 which extend perpendicularly in relation to the through-opening 17, and consequently radially away from the axis of rotation 37, may be provided in the inner wall 21 of the through-opening 17 of the further workpiece 3. In FIG. 5 it is shown in detail that it is also possible for a helically extending depression 27 to be provided in the inner wall 21 of the through-opening 17 alongside the portion 19. It is additionally conceivable that the inner wall 21 of the through-opening 17 has only one or more clearances 23 or only a helically extending depression 27 and no portion 19 or else a combination of one or more clearances 23 and a helical depression 27.

In FIG. 1 a) it is shown that the further workpiece 3 is placed against the plastic workpiece 1 in such a way that the second abutting surface 13 lies on the first abutting surface 5 and that the pin 7 extends through the through-opening 17 and beyond the working surface 15.

In addition, a friction tool 29 is placed against the further workpiece 3. The friction tool 29 comprises a friction pin 31, a sleeve 33 and a clamping ring 35, which are all cylindrically formed. The friction pin 31 is driven in a rotating manner about an axis of rotation 37 and has a friction surface 39 extending perpendicularly in relation to the axis of rotation 37 and facing the end face 9 of the pin 7. The friction surface 39 has the same dimensions as the end face 9 and is arranged on the end face 9 such that, when there is a rotation of the friction pin 31 about the axis of rotation 37, it lies completely flat against the friction surface 39 at all angles of rotation.

The sleeve 33 is arranged between the friction pin 31 and the clamping ring 35 and likewise driven in a rotating manner about the axis of rotation 37. It has a sleeve friction surface 41 extending perpendicularly in relation to the axis of rotation 37. The inside diameter of the sleeve 33 corresponds to the outside diameter of the pin 7. When the friction tool 29 is placed against the further workpiece 3, the sleeve friction surface 41 lies flat on the working surface 15 thereof and an inner surface 43 of the sleeve 33 that is facing the friction pin 31 lies against the pin 7.

The clamping ring 35 surrounding the sleeve 33 has a clamping surface 45 lying flat on the working surface 15 and extending perpendicularly in relation to the axis of rotation 37. Moreover, provided in the clamping ring 35 is a melt clearance 47, which represents the transition between an inner surface of the clamping ring 35, facing the sleeve 33, and the clamping surface 45 and which extends away from the axis of rotation 37 parallel to the working surface 15 into the clamping ring 35. The friction tool 29 is formed in such a way that the friction pin 31, the sleeve 33 and the clamping ring 35 can be moved parallel to the axis of rotation 37.

Once the friction tool 29 has being placed against the further workpiece 3 in the way described above, the friction pin 31 and the sleeve 33 are set in rotation, rotating about the same axis of rotation 37 with the same direction of rotation. As a difference from this, the clamping ring 35 is not rotated and the clamping surface 45 lies fixed on the working surface 15. Frictional heat is thereby produced by the friction of the friction surface 39 against the end face 9, the inner surface 43 against the pin 7 and the sleeve friction surface 31 against the working surface 15. The further workpiece 3 is preferably formed from a material that has good heat conducting properties, so that the pin 7 is uniformly heated and thereby brought into a plastic state.

In a further step according to FIG. 1 b), the rotating friction pin 7 is moved parallel to the axis of rotation 37 toward the working surface 15 and the rotating sleeve 33 is at the same time moved away from the working surface 15. This allows the pin 7 that has been brought at least partially into a plastic state to be plastically deformed into the melt clearance 47 along the working surface 15.

According to FIG. 1 c), the rotating pin 7 and the rotating sleeve 33 are moved until the pin 7 has been plastically deformed to the extent that it completely fills the melt clearance 47. The friction surface 39 and the sleeve friction surface 41 also lie in one plane and flush with the end face 9 of the plastically deformed pin 7. Subsequently, the friction tool 29 can be removed from the workpieces 1, 3, the two workpieces 1, 3 being positively connected once the plastically deformed pin 7 has cooled down.

The exemplary embodiment according to the invention as shown in FIG. 1 has the advantage that the frictional energy for bringing the pin 7 into a plastic state is introduced into it directly. The fact that the pin 7 is heated both from the end face 9 and from an outer surface 49 means that it is brought into a plastic state particularly quickly. In this way it is possible to deform the pin 7 plastically within a very short time and at the same time to subject it only to low mechanical loads.

In FIG. 2 there is shown a further exemplary embodiment, which differs from the first exemplary embodiment in that the friction surface 39 of the friction pin 31 of the placed friction tool 29 has greater dimensions than the end face 9 of the pin 7 of the plastic workpiece 1 that is provided. Consequently, the inside diameter of the sleeve 33 is also greater than the outside diameter of the pin 7, and the inner surface 43 does not lie against the pin 7. When the friction tool 29 is placed against the further workpiece 3, the sleeve friction surface 41 is in one plane with the friction surface 39 and therefore does not lie against the working surface 15. Nevertheless, the clamping ring 35 lies on the working surface 15.

Once the friction pin 31 and the sleeve 33 have been set in rotation, while here, too, the clamping ring 35 lies fixed on the working surface 15, frictional heat is produced only by the friction between the friction surface 39 and the end face 9. The pin 7 is therefore only heated from the end face 9. The rotating friction pin 31 and the rotating sleeve 33 are moved parallel to the axis of rotation 37 toward the working surface 15, the friction surface 39 and the sleeve friction surface 41 either being in one plane or else the distance between the friction surface 39 and the working surface 15 being less than the distance between the sleeve friction surface 41 and the working surface 15, according to FIG. 2 b). In the latter case, with the sleeve 33 offset, the deformation of the pin 7 can consequently be controlled.

According to FIG. 2 c), the rotating friction pin 31 and the rotating sleeve 33 are moved altogether until the pin 7 has been plastically deformed in such a way that it completely fills the melt clearance 47 and the friction surface 39 and the sleeve friction surface 41 are in one plane.

This exemplary embodiment is particularly advantageous since any form of pin 7 can be worked, as long as the cross section of the pin 7 is less than the joint cross section of the friction surface 39 and the sleeve friction surface 41. This obviates the need for time-consuming changes of the friction tool 29 when pins 7 of different sizes on the same plastic workpiece 1 are provided for connection to a further workpiece 3.

If, as is shown in FIG. 3, the through-opening 17 is provided with a portion 19 with dimensions increasing toward the working surface 15, the advantage is obtained that it is also possible for a positive connection to be already achieved by the pin 7 being expanded within the through-opening 17 during the deformation. This increases the strength of the connection, and it may be possible to dispense with the need for the deformed pin 7 to extend from the through-opening 17 beyond the working surface 15 and for it to lie against the working surface 15.

The strength of the connection can be further increased by one or more clearances 23 which extend perpendicularly from the through-opening 17 into the inner wall 21 being formed, as represented in FIG. 4. Here, a positive connection can likewise be achieved just by the pin 7 being deformed into the clearances 23. Alternatively, it is also possible according to the representation in FIG. 5 to provide the inner wall 21 of the through-opening 17 with a helically extending clearance 27. When the pin 7 deforms into the helically extending clearance 27, a positive connection is likewise produced.

The method according to the invention makes it possible in a simple way to form a positive connection between a plastic workpiece 1 and a further workpiece 3 without great complexity of the equipment required. Since the pin 7 is brought into a plastic state before its plastic deformation, the mechanical loads to which the material of the pin is subjected are particularly small. The connections created in this way therefore have a particularly high strength. In comparison with other methods that likewise bring the pin 7 into a plastic state before the plastic deformation, the method according to the invention is distinguished by a particularly low energy consumption, since the frictional energy is introduced directly into the element to be deformed, that is the pin 7.

What is claimed is:

1. A method for connecting a plastic workpiece to a further workpiece, the method comprising:
   providing a plastic workpiece, the plastic workpiece comprising a first abutting surface, provided on which is a pin projecting away from it and having an end face facing away from the first abutting surface,
   providing a further workpiece, the further workpiece comprising a second abutting surface and a working surface opposite from the second abutting surface, a through-opening which is adapted to the cross section of the pin and extends from the second abutting surface to the working surface being provided in the further workpiece,
   placing the further workpiece and the plastic workpiece against each other in such a way that the second abutting surface lies on the first abutting surface, and the pin extends through the through-opening, beyond the working surface,
   placing a friction tool against the further workpiece, the friction tool having a friction pin and a clamping ring, the friction pin being drivable in a rotating manner about an axis of rotation, the friction pin comprising a friction surface extending perpendicularly in relation to the axis of rotation the clamping ring comprising a clamping surface extending perpendicularly in relation to the axis of rotation, the clamping ring surrounding the friction pin and the friction pin and the clamping ring being able to be moved parallel to the axis of rotation, wherein placement of the friction tool against the further workpiece comprises the friction surface being placed flat on the end face and the clamping surface being placed flat on the working surface,
   rotating the friction pin, so that the frictional heat produced by friction between the friction surface and the end face brings at least a portion of the pin into a plastic state, and
   moving the rotating friction pin parallel to the axis of rotation toward the working surface, so that the pin is plastically deformed.

2. The method of claim 1, wherein the friction surface has such dimensions that, when there is a rotation of the friction pin about the axis of rotation, the end face lies completely flat against the friction surface at all angles of rotation.

3. The method of claim 1, wherein the pin is cylindrically formed.

4. The method of claim 3, wherein the outside diameter of the friction pin corresponds to the outside diameter of the pin.

5. The method of claim 1, wherein the friction tool has an annular sleeve, which is driven in a rotating manner about the axis of rotation, the sleeve being movable parallel to the axis of rotation and comprising a sleeve friction surface that extends perpendicularly in relation to the axis of rotation, the sleeve being arranged between the friction pin and the clamping ring, the sleeve being rotated when the friction pin rotates, and the sleeve being moved away from the working surface when the friction pin moves toward the working surface.

6. The method of claim 5, wherein placement of the friction tool involves placement of the sleeve friction surface against the working surface.

7. The method of claim 1, wherein the friction tool has an annular sleeve, which is driven in a rotating manner about the axis of rotation, the sleeve being movable parallel to the axis of rotation and comprising a sleeve friction surface that extends perpendicularly in relation to the axis of rotation, the sleeve being arranged between the friction pin and the clamping ring, the sleeve being rotated when the friction in rotates, and during the moving of the friction pin, the sleeve also being moved parallel to the friction surface toward the working surface.

8. The method of claim 7, wherein the sleeve friction surface is offset from the plane of the friction surface during the moving of the friction pin.

9. The method of claim 7, wherein the sleeve friction surface is in the plane of the friction surface during the moving of the friction pin.

10. The method of claim 1, wherein the further workpiece is formed from a metal, a metal alloy, a ceramic or a composite material.

11. The method of claim 1, wherein the further workpiece is formed from plastic.

12. The method of claim 1, wherein the through-opening has alongside the working surface a portion in which the dimensions of the through-opening increase toward the working surface.

13. The method of claim 1, wherein one or more clearances, which extend perpendicularly in relation to the through-opening, being provided in the inner wall of the through-opening of the further workpiece.

14. The method of claim 1, wherein a helically extending depression is provided in the inner wall of the through-opening of the further workpiece.

15. The method of claim 3, wherein the friction tool has an annular sleeve, which is driven in a rotating manner about the axis of rotation, the sleeve being movable parallel to the axis of rotation and comprising a sleeve friction surface that extends perpendicularly in relation to the axis of rotation, the sleeve being arranged between the friction pin and the clamping ring, the sleeve being rotated when the friction pin rotates, and the sleeve being moved away from the working surface when the friction pin moves toward the working surface.

16. The method of claim 15, wherein the inside diameter of the sleeve corresponding to the outside diameter of the pin, and wherein placement of the friction tool involves the sleeve being positioned in such a way that an inner surface of the sleeve that is facing the friction pin lies against the pin.

* * * * *

UNITED STATES PATENT AND TRADEMARK OFFICE
CERTIFICATE OF CORRECTION

PATENT NO. : 8,518,198 B2
APPLICATION NO. : 13/659193
DATED : August 27, 2013
INVENTOR(S) : Sergio de Traglia Amancio Filho et al.

Page 1 of 1

It is certified that error appears in the above-identified patent and that said Letters Patent is hereby corrected as shown below:

On the Title Page, foreign application priority data was omitted and should be as follows:

--(30) Foreign Application Priority Data Oct. 25, 2011 (EP) 11186527.5--

Signed and Sealed this
Twelfth Day of November, 2013

Teresa Stanek Rea
*Deputy Director of the United States Patent and Trademark Office*